United States Patent
Li et al.

(10) Patent No.: US 8,221,525 B2
(45) Date of Patent: Jul. 17, 2012

(54) OXYGEN ENRICHMENT USING SMALL-PORE SILICOALUMINOPHOSPHATE MEMBRANES

(75) Inventors: Shiguang Li, Mount Prospect, IL (US); Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 166 days.

(21) Appl. No.: 12/837,563

(22) Filed: Jul. 16, 2010

(65) Prior Publication Data

US 2012/0012001 A1   Jan. 19, 2012

(51) Int. Cl.
  *B01D 53/22* (2006.01)
  *B01D 67/00* (2006.01)
  *B01D 71/02* (2006.01)

(52) U.S. Cl. ............... 95/54; 95/45; 96/4; 96/10; 96/11; 502/4; 264/653; 264/666; 427/245; 427/397.7

(58) Field of Classification Search ................ 95/45, 54; 96/4, 10, 11; 423/709; 502/4, 60; 264/653, 264/661, 666; 427/245, 246, 397.7, 398.1, 427/435, 443.2
  See application file for complete search history.

(56) References Cited

U.S. PATENT DOCUMENTS

| | | | | |
|---|---|---|---|---|
| 4,440,871 A | * | 4/1984 | Lok et al. | 502/214 |
| 5,069,794 A | * | 12/1991 | Haag et al. | 95/54 |
| 7,316,727 B2 | | 1/2008 | Falconer et al. | |
| 2005/0139066 A1 | | 6/2005 | Miller et al. | |
| 2008/0216650 A1 | * | 9/2008 | Falconer et al. | 95/51 |
| 2010/0116130 A1 | * | 5/2010 | Carreon et al. | 95/45 |

OTHER PUBLICATIONS

Cui, Ying et al., "Preparation and gas separation properties of zeolite T membranes", Chem. Commun. 2003, 2154-2155.
Baker, Richard W., "Future Directions of Membrane Separation Technology", Ind. Eng. Chem. Res. 2002, 41, 1393-1411.

* cited by examiner

*Primary Examiner* — Jason M Greene
(74) *Attorney, Agent, or Firm* — Mark E. Fejer

(57) ABSTRACT

A method of oxygen enrichment in which a gaseous mixture containing $O_2$ molecules and $N_2$ molecules is provided to a feed side of a SAPO molecular sieve, oxygen enrichment membrane having pore sizes suitable for discriminating between $O_2$ molecules and $N_2$ molecules, resulting in selective transport of the $O_2$ molecules through the membrane to a permeate side of the membrane. Also disclosed is a method for producing the membrane.

12 Claims, 3 Drawing Sheets

OXYGEN ENRICHMENT USING SMALL-PORE SILICOALUMINOPHOSPHATE MEMBRANES

BACKGROUND OF THE INVENTION

1. Field of the Invention

This invention relates to silicoaluminophosphate (SAPO) molecular sieves. In one aspect, this invention relates to small-pore SAPO molecular sieve membranes disposed on a porous support. In one aspect, this invention relates to a method for making and using SAPO molecular sieve membranes. In one aspect, this invention relates to a method of oxygen enrichment from air. In one aspect, this invention relates to the use of SAPO molecular sieve membranes for oxygen enrichment from air.

2. Description of Related Art

It will be appreciated by those skilled in the art that there are numerous industrial and other processes for which the use of oxygen having concentrations greater than the concentration of oxygen in air is highly beneficial. For example, the use of oxygen-enriched air in industrial combustion processes provides several advantages including fuel savings up to about 15%, $CO_2$ reductions up to about 25% and efficiency increases up to about 20%. In fuel cells, the oxygen reduction rate is determined by the cathode catalyst and the oxygen concentration (mass transfer limitations). As a result, higher oxygen concentrations improve fuel cell performance. Empirically, at 400 $mA/cm^2$ current density, if oxygen concentration increases by 10%, the fuel cell performance would increase by at least 10-20 mV depending on the pressure. The balance between the oxygen concentration and water releases from the catalyst surface, i.e. three phase area, is significantly improved as oxygen concentration increases.

The existing technologies for oxygen production include vacuum swing adsorption and cryogenic oxygen on site. However, as shown in FIG. 1, the costs associated with these technologies are very high, particularly when compared with the costs of membrane processes, which are less expensive, require less energy to operate, and do not require chemicals or regenerating absorbents to maintain. In addition, membranes are compact and can be retrofitted onto the combustion systems and fuel cells without complicated integration.

SAPO membranes, also known as SAPO molecular sieve membranes, are inorganic oxides largely composed of Si, Al, P, and O and can have a three-dimensional microporous crystal framework structure which provides cages, channels and cavities which enable separation of mixtures of molecules based on their effective sizes. SAPO crystals may be synthesized by hydrothermal crystallization from a reaction mixture containing reactive sources of silica, alumina, and phosphate, and an organic templating agent. See, for example, U.S. Pat. No. 7,316,727 to Falconer et al. which teaches SAPO membranes prepared by contacting at least one surface of a porous membrane support with an aged synthesis gel, forming a layer of SAPO crystals on at least one surface of the support as well as possibly in the pores of the support. The SAPO membranes produced in accordance with the Falconer et al. patent are said to have improved selectivity for mixtures of carbon dioxide and methane.

An important parameter in the use of SAPO membranes for gas separations is the separation selectivity of the membrane. For two gas components a and b, a separation selectivity $S_{a/b}$ greater than one suggests that the membrane is selectively permeable to gas component a. Thus, if a gaseous stream containing both gas components a and b is provided to a feed side of the membrane, the permeate stream exiting the permeate side of the membrane will be enriched in gas component a and depleted in gas component b. Accordingly, the greater the separation selectivity, the greater the enrichment of the permeate stream in gas component a.

The kinetic diameter of a molecule is a reflection of the smallest effective dimension of a given molecule. It will be appreciated that a given molecule can have more than one dimension, which characterizes its size, if the molecule is not spherical. For example, $O_2$ and $N_2$ are diatomic molecules which are not spherical in shape but rather are cylindrical in shape. Thus, a "length" dimension of the cylindrical shape is a larger dimension than the smaller "waistline" diameter of the cylindrical shape. In transport phenomena, the molecule with the smallest effective "waistline" diameter is that which behaves as the smallest molecule, i.e., has the smallest kinetic diameter. For $O_2$, the kinetic diameter is about 0.346 nm and for $N_2$, the kinetic diameter is about 0.364 nm.

SUMMARY OF THE INVENTION

It is, thus, one object of this invention to provide a method for producing oxygen-enriched air using membrane separation techniques.

It is another object of this invention to provide a membrane suitable for use in enriching the oxygen concentration of air.

It is yet another object of this invention to provide a method for producing membranes suitable for use in enriching the oxygen concentration of air.

These and other objects of this invention are addressed by a method of oxygen enrichment comprising the steps of providing a SAPO molecular sieve, oxygen enrichment membrane having pore sizes suitable for discriminating between $O_2$ molecules and $N_2$ molecules and providing a gaseous mixture comprising $O_2$ molecules and $N_2$ molecules to a feed side of said membrane resulting in selective transport of said $O_2$ molecules through said membrane to a permeate side of said membrane. The method for producing a suitable SAPO molecular sieve membrane for use in the method of this invention generally comprises selecting SAPO molecular sieves having pores that can discriminate $O_2$ (kinetic diameter of 0.346 nm) and $N_2$ (kinetic diameter of 0.364 nm) molecules. The SAPO molecular sieves preferably have higher adsorption capacity for $O_2$ than $N_2$, which is helpful as adsorbed $O_2$ would narrow down membrane pores and further block $N_2$ from being transported through the membrane. After selection of the SAPO molecular sieves, a porous membrane support is seeded with homogeneous SAPO crystals having a diameter less than or equal to about 2 μm. Any known seeding technique, for example, dip coating, is used to attach nano-sized seed crystals to the porous membrane support. Following seeding of the porous membrane support, a continuous molecular sieve layer is formed by placing the seeded support in a gel composition containing structure directing agents (SDAs) followed by hydrothermal synthesis to obtain the desired molecular sieve layer and structure. Thereafter, the molecular sieve layer is calcined to remove the SDAs. In accordance with one preferred embodiment, the calcination method involves rapid thermal processing followed by conventional calcination to reduce the fraction of large non-molecular sieve pores (grain boundaries between crystals). In accordance with one embodiment, the membrane is subjected to a post-treatment process, e.g. chemical layer deposition, to systematically reduce the pores to improve $O_2/N_2$ selectivity. The membranes thus produced have superior thermal, mechanical and chemical stability, good erosion resistance, and high pressure stability as compared to conventional polymeric membranes. In accordance with one embodiment of this invention, the seed crystals are prepared using a synthesis gel composition of 1.0 $Al_2O_3$:1.0 $P_2O_5$:0.4 $SiO_2$:1.0 TEAOH:0.8 dipropylamine:0.8 cyclohexylamine:at least 100 $H_2O$ and the molecular sieve layer is formed using a gel composition of 1.0 $Al_2O_3$:1.0 $P_2O_5$:0.4 $SiO_2$:1.0 TEAOH:1.6 dipropylamine:at least 100 $H_2O$.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
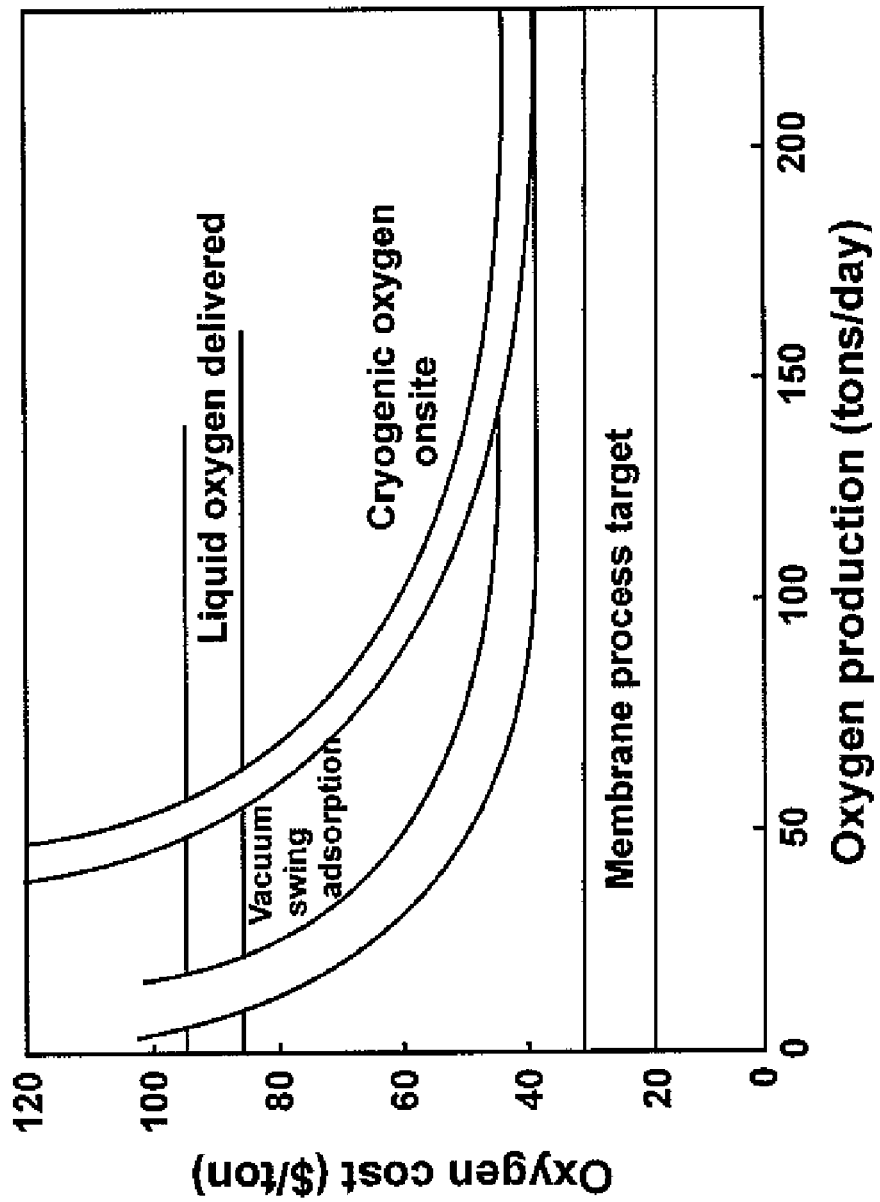
FIG. 1 is a diagram showing a comparison of oxygen production technologies and associated costs.

As used herein, the term "calcination" or "calcining" refers to a thermal treatment process applied to ores and other solid materials in order to bring about a thermal decomposition, phase transition, or removal of a volatile fraction and is distinguishable from other thermal treatment processes in which more complex gas-solid reactions take place between the furnace atmosphere and the solids. The calcination process normally takes place at temperatures below the melting point of the product material.

The transport mechanism for the membrane of this invention is based on adsorption-diffusion mechanisms including five steps: 1) adsorption onto the membrane surface; 2) migration into the molecular sieve pores; 3) diffusion through the molecular sieve micropores; 4) migration out of the pores onto the surface; and 5) desorption from the membrane surface. Competitive adsorption and the difference in diffusivities are responsible for the selectivity. The membrane is selective for $O_2$ over $N_2$ because $O_2$ is smaller (diffuses faster) and has higher adsorption coverage than $N_2$.

As previously indicated, the membranes of this invention are prepared by a seeding technique through which a layer of seeds is formed on a porous support where they act as nuclei for crystal growth. In this exemplary embodiment of the method of this invention, the synthesis gel composition for the seeds in accordance with one embodiment of this invention was 1.0 $Al_2O_3$:1.0 $P_2O_5$:0.4 $SiO_2$:1.0 TEAOH:0.8 dipropylamine:0.8 cyclohexylamine:120 $H_2O$. In a typical synthesis, $Al(i-C_3H_7O)_3$, $H_3PO_4$ and deionized $H_2O$ were stirred for 1 hour after which a Ludox AS-40 colloidal silica (40 wt % suspension in water, Sigma-Aldrich) was added and the resulting solutions stirred for another 0.5 hours. Thereafter, the tetraethylammonium hydroxide (TEAOH) (35 wt % solution in water, Sigma-Aldrich), dipropylamine (99%, Aldrich), and cyclohexylamine (99%, Sigma-Aldrich) were added and the solution stirred for 3 hours at 60° C. The solution was then placed in an autoclave and held at 220° C. for 6 hours. After the solution was cooled, it was centrifuged at 4000 RPM for 5 minutes to separate the seeds, which were then washed with water. This procedure was repeated three times. The resultant precipitate was dried and then calcined at 500° C. for 8 hours. The calcination heating and cooling rates were approximately 1 and 2° C./min, respectively.

Porous stainless steel tubes (Mott Corp.) were seeded by rubbing the inside of the tubes with the crystals. The outside of the tube was wrapped in TEFLON® tape, and the gel composition for secondary growth was 1.0 $Al_2O_3$:1.0 $P_2O_5$:0.4 $SiO_2$:1.0 TEAOH:1.6 dipropylamine:120 $H_2O$. The synthesis procedure was similar to that for the seeds except that cyclohexylamine was not used. The seeded tubes were placed vertically in an autoclave, which was then filled with synthesis gel. Hydrothermal synthesis was carried out at 220° C. for 6 hours. After the synthesis, the membranes were washed and dried at 90° C. for 1 hour.

The calcination of the membranes in accordance with one embodiment of this invention includes two steps. In the first step, the membranes were placed directly in a 700° C. oven for 1 minute and then taken out to cool down to room temperature. In the second step, the membranes were calcined in air at 390° C. for 20 hours to remove the templates from the zeolite framework. The heating and cooling rates were 0.5 and 0.5° C. per minute, respectively.

Figure 2:
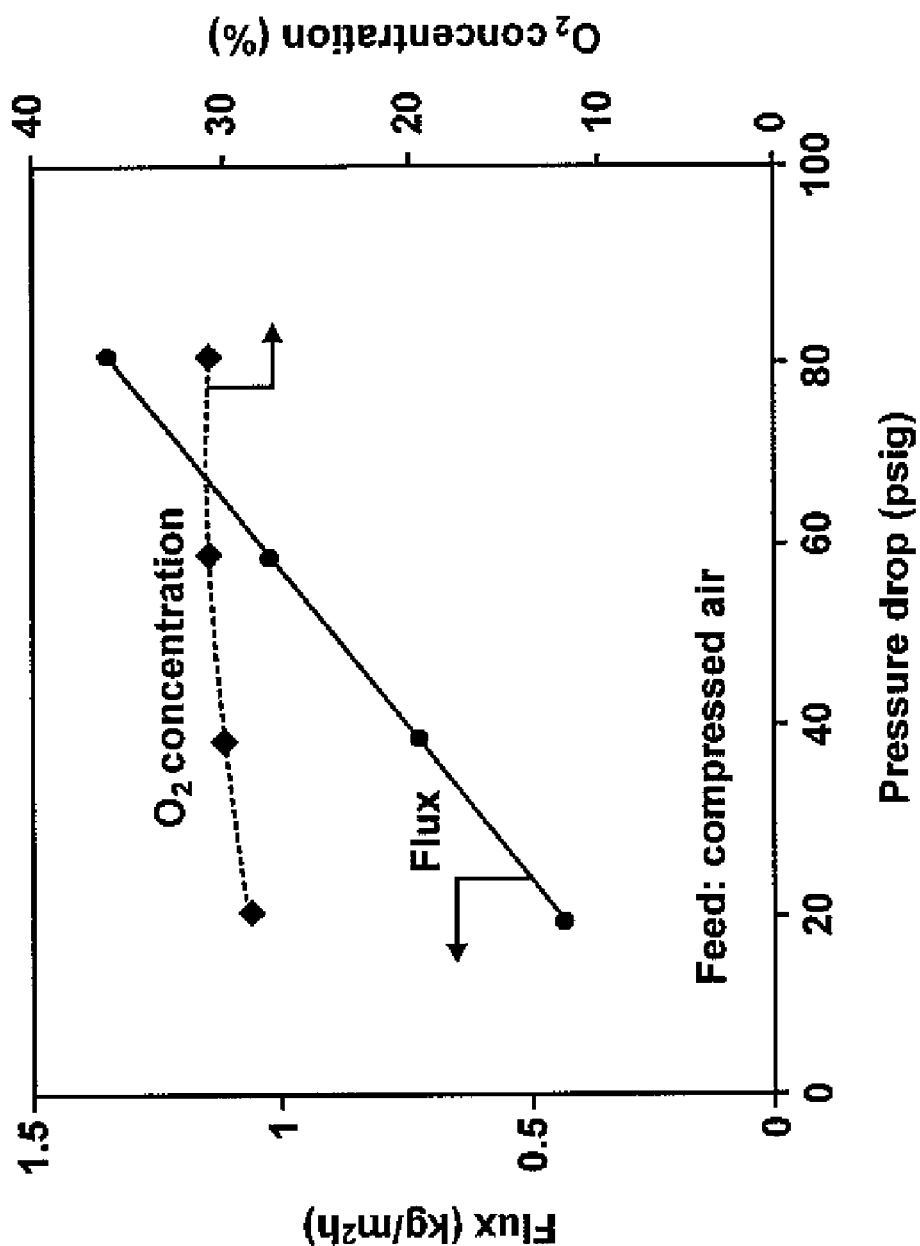
FIG. 2 is a diagram showing the flux and $O_2$ concentration as a function of pressure drop for a SAPO membrane produced in accordance with one embodiment of the method of this invention.
Figure 3:
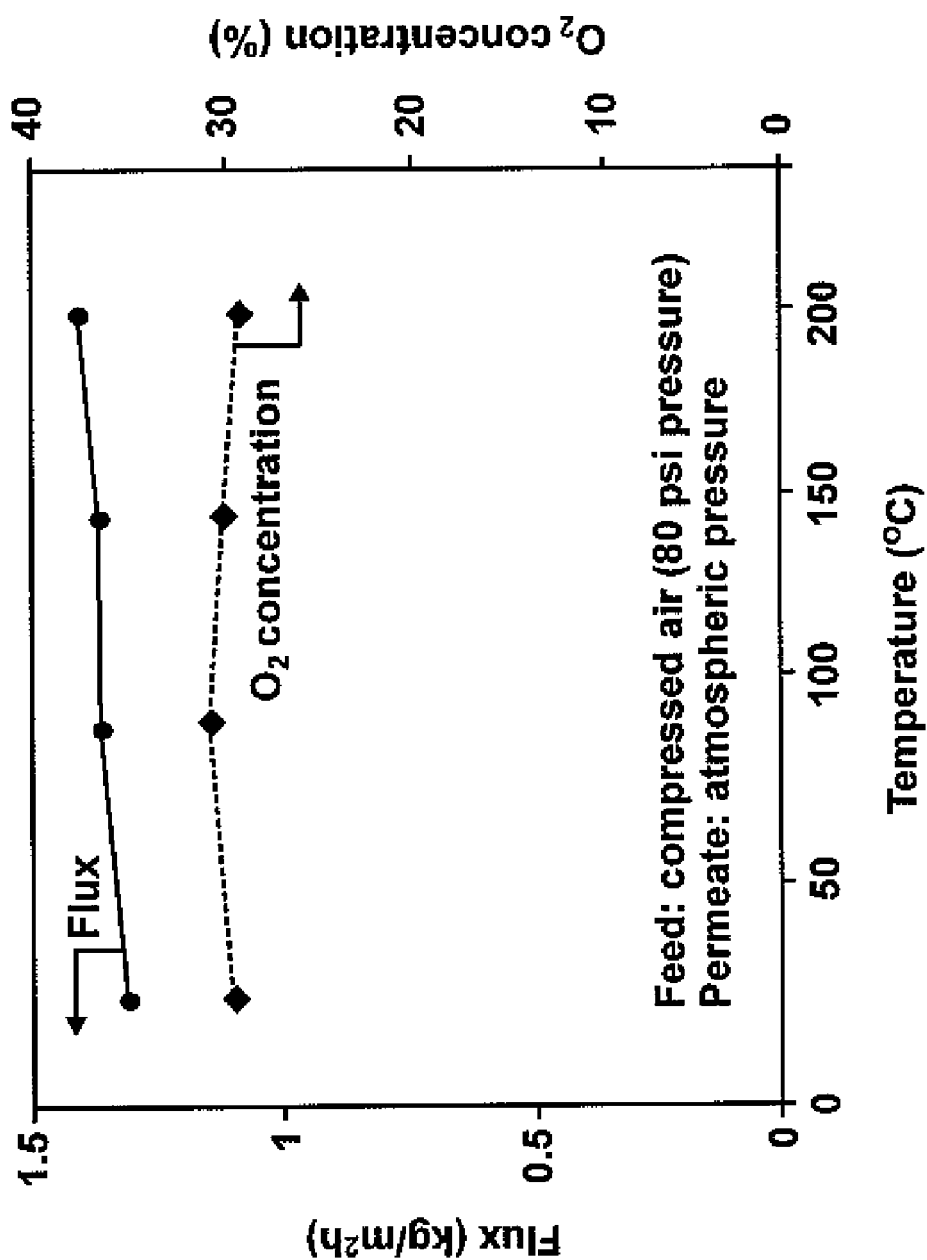
FIG. 3 is a diagram showing the flux and $O_2$ concentration as a function of temperature for a SAPO membrane produced in accordance with one embodiment of the method of this invention.

The membranes produced in accordance with the method of this invention are SAPO membranes suitable for oxygen separations. In accordance with one embodiment, this invention provides a method in which a SAPO membrane produced in accordance with the method of this invention is employed for enriching $O_2$ from 21% to 31%. FIG. 2 shows the flux and $O_2$ concentration for in-house compressed air (about 21%) feed as a function of pressure drop. The permeate side was under atmospheric pressure. As shown, the $O_2$ concentrations were between 28.4% and 30.9% in the pressure drop range measured. FIG. 3 shows that the membrane produced in accordance with the method of this invention was also effective for oxygen separation at temperatures up to about 200° C., the highest temperature measured.

The SAPO molecular sieve membranes of this invention are inorganic oxides with an underlying support of ceramic or metal. These membranes are far more robust than conventional polymeric membranes and they are usable in high-pressure environments. In addition, these membranes are stable to at least 400° C. as well as in chemically corrosive environments. Even if these membranes are fouled, they can be easily regenerated by calcinations at 400° C.

Small-pore silicoaluminophosphates of this invention include SAPO-17 (ERI structure, 0.36×0.51 nm channels), SAPO-18 (AEI, 0.38×0.38 nm), SAPO-34 (CHA, 0.38×0.38 nm), SAPO-35 (LEV, 0.36×0.48 nm), SAPO-42 (LTA, 0.41×0.41 nm), SAPO-52 (0.32×0.38 nm), and SAPO-56 (AFX, 0.34×0.36 nm).

Example 1

In this example, a conventional SAPO-34 molecular sieve membrane made in accordance with conventional methods and a SAPO-34 molecular sieve membrane made in accordance with the method of this invention were produced and their performances compared. Table 1 shows a comparison of a conventional method for producing SAPO-34 molecular sieve membranes and the method in accordance with one embodiment of this invention for producing SAPO-34 molecular sieve membranes. The primary difference between the conventional method and the method of this invention as shown in Table 1 is in the seeds gel and membranes gel compositions employed. In particular, although the amount of $SiO_2$ employed is slightly different, the primary difference is in the amount of water employed. As can clearly be seen, this difference results in a substantially less amount of time required to produce the membrane of this invention compared with the conventionally produced membrane. As will be seen herein below, in addition to reducing the amount of time required to produce the membrane, the method of this invention for producing SAPO-34 molecular sieve membranes produces a membrane which is significantly superior in its ability to produce oxygen enriched air compared with the conventionally produced membrane.

TABLE 1

Comparison of the Membrane Preparation Conditions

| Preparation conditions | Conventional method | This invention |
|---|---|---|
| Seeds gel composition | 1.0 $Al_2O_3$: 1.0 $P_2O_5$: 0.3 $SiO_2$: 1.0 TEAOH: 0.8 dipropylamine: 0.8 cyclohexylamine: 77 $H_2O$ | 1.0 $Al_2O_3$: 1.0 $P_2O_5$: 0.4 $SiO_2$: 1.0 TEAOH: 0.8 dipropylamine: 0.8 cyclohexylamine: 120 $H_2O$ |
| Membrane gel composition | 1.0 $Al_2O_3$: 1.0 $P_2O_5$: 0.3 $SiO_2$: 1.0 TEAOH: 1.6 dipropylamine: 77 $H_2O$ | 1.0 $Al_2O_3$: 1.0 $P_2O_5$: 0.4 $SiO_2$: 1.0 TEAOH: 1.6 dipropylamine: 120 $H_2O$ |
| Gel aging time | 3 days | 3 hrs |
| Crystallization time | 220° C. for 24 hrs | 220° C. for 6 hrs |
| Calcination | Calcined in air at 400° C. for 8 hours, heating and cooling rates of 0.7 and 0.9° C./min, respectively | Two steps: 1) membranes directly placed in oven at 700° C. for one minute, then cooled to room temperature, 2) membranes calcined in air at 390° C. for 20 hrs, heating and cooling rates of 0.5° C./min, respectively |
| Resulting structure | CHA (pore size: 0.38 nm) | Most likely a mixture of AEI (0.38 nm) and CHA (0.38 nm) |

Table 2 shows a comparison of oxygen enrichment performance between the conventional membrane produced in accordance with the method shown in Table 1 and the membrane produced in accordance with the method of the invention as shown in Table 1.

TABLE 2

Comparison of Oxygen Enrichment Performance

| Membrane | Flux (mol/$m^2$ – s) | Oxygen enrichment |
|---|---|---|
| Conventional | 1.79E−4 | 24.1% |
| This invention | 6.62E−04 | 29.3% |

Permeate pressure = 101.9 kPa; pressure drop = 275.8 kPa, air feed

As shown in Table 2, the flux of the membrane produced in accordance with the method of this invention was 3.7 times the flux of the conventional membrane, and the oxygen enrichment concentration obtained was also higher.

Example 2

In this example, a membrane was produced in accordance with one embodiment of the method of this invention in which a conventional calcination process was employed as opposed to the two step calcination process discussed herein above. Table 3 shows the membrane preparation conditions.

TABLE 3

Membrane Preparation Conditions

| Seeds gel composition | 1.0 $Al_2O_3$: 1.0 $P_2O_5$: 0.4 $SiO_2$: 1.0 TEAOH: 0.8 dipropylamine: 0.8 cyclohexylamine: 120 $H_2O$ |
|---|---|
| Membrane gel composition | 1.0 $Al_2O_3$: 1.0 $P_2O_5$: 0.4 $SiO_2$: 1.0 TEAOH: 1.6 dipropylamine: 120 $H_2O$ |
| Gel aging time | 3 hrs |
| Crystallization time | 220° C. for 6 hrs |
| Calcination | Calcined in air at 400° C. for 8 hrs, heating and cooling rates of 0.7 and 0.9° C./min, respectively |

Table 4 shows a comparison of the performance of the membrane produced in accordance with one embodiment of the method of this invention as shown in Table 3 and a membrane produced in accordance with one embodiment of the method of this invention in which a two-step calcination process is employed.

TABLE 4

Comparison of oxygen enrichment performance at 22° C.

| Membrane | Flux (mol/$m^2$ – s) | Oxygen enrichment |
|---|---|---|
| SAPO-34 membrane (conventional calcination) | 2.01E−4 | 28.7% |
| SAPO-34 membrane (two-step calcination) | 6.62E−04 | 29.3% |

Permeate pressure = 101.9 kPa, Pressure drop = 275.8 kPa, air feed

As shown in Table 4, although the oxygen enrichment performance is substantially the same for both membranes, the membrane produced in accordance with the embodiment of the method of this invention employing a two-step calcination process enjoys a substantially higher flux rate, resulting in a substantially faster oxygen enrichment. However, in both instances, the oxygen enrichment performance of the membranes is significantly superior to the performance of conventionally produced SAPO-34 membranes.

Depending on the anticipated application, conventional SAPO-34 molecular sieve membranes are frequently subjected to a post-synthesis treatment in order to block the non-zeolite pores formed between grain boundaries, thereby improving the membrane performance. In accordance with one embodiment of the method of this invention, following calcination, the membrane is subjected to a post-treatment process.

Example 3

In this example, the membrane of this invention produced in Example 1 was subjected to a post-treatment process in which the membrane was soaked in a 1.2% aqueous solution of β-cyclodextrin at room temperature for 0.5 hrs and subsequently dried for 4 hrs at about 200° C. Table 5 shows a comparison of the performance of the membrane of this invention before and after treatment with cyclodextrin. As shown therein, the flux rate is reduced by the post-treatment, which would be expected due to the reduction in non-zeolite pores, but the oxygen enrichment is nearly 10% greater, believed to be due to a slight reduction in the zeolite pores which would decrease the diffusion rate of $N_2$ more than that of $O_2$, thereby increasing the $O_2/N_2$ selectivity.

TABLE 5

Oxygen enrichment before and after post-treatment

| Membrane | Flux (mol/m² – s) | Oxygen enrichment |
|---|---|---|
| Membrane before cyclodextrin treatment | 6.64E–4 | 29.3% |
| Membrane after cyclodextrin treatment | 4.14E–04 | 32.2% |

Other possible post-treatment methods include, but are not limited to, gas (vapor) or liquid chemisorptions, ion exchange, and chemical vapor deposition (CVD). Greater control of the thickness of the deposition and uniformity of the pores may be obtained using sequential, alternating exposures of the two reactants. This modified CVD method is also referred to as atomic layer deposition (ALD).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An oxygen enrichment membrane produced in accordance with a method comprising the steps of:
    forming a plurality of SAPO seed crystals from a synthesis gel composition of 1.0 $Al_2O_3$:1.0 $P_2O_5$:0.4 $SiO_2$:1.0 TEAOH:0.8 dipropylamine:0.8 cyclohexylamine:at least 100 $H_2O$;
    seeding a porous support with said SAPO seed crystals, forming a seeded porous support;
    heating said seeded porous support in a heating vessel containing a membrane synthesis gel composition of 1.0 $Al_2O_3$:1.0 $P_2O_5$:0.4 $SiO_2$:1.0 TEAOH:1.6 dipropylamine:at least 100 $H_2O$, forming a membrane of SAPO crystals; and
    calcining said membrane of SAPO crystals, forming said oxygen enrichment membrane.

2. The oxygen enrichment membrane of claim 1, wherein said SAPO crystals are less than or equal to about 2 μm in size.

3. The oxygen enrichment membrane of claim 1, wherein said seeded porous support is heated to a temperature of at least 200° C. and held at said temperature for less than about 8 hours.

4. The oxygen enrichment membrane of claim 1, wherein said membrane of SAPO crystals is calcined in two heating steps, a first said step comprising placing said membrane in an oven at a temperature of at least about 700° C. for less than about 2 minutes followed by cooling to room temperature, and a second said step comprising heating said cooled membrane in air at least about 350° C. for up to about 20 hours.

5. The oxygen enrichment membrane of claim 4, wherein a heating rate of said membrane is about 0.5° C./min and a cooling rate of said membrane is about 0.5° C./min.

6. The oxygen enrichment membrane of claim 1, wherein said porous support is made of one of a ceramic and a metal.

7. A method of oxygen enrichment comprising the steps of:
    providing a SAPO molecular sieve membrane having pore sizes suitable for discriminating between $O_2$ molecules and $N_2$ molecules, said membrane produced by forming a plurality of SAPO seed crystals from a precursor material, seeding a porous support with said SAPO seed crystals, forming a seeded porous support, immersing said seeded porous support in a membrane synthesis gel composition of about 1.0 $Al_2O_3$:1.0 $P_2O_5$:0.4 $SiO_2$:1.0 TEAOH:1.6 dipropylamine:at least 100 $H_2O$ and heating said immersed seeded porous support, forming a SAPO crystal membrane, and calcining said SAPO crystal membrane at about 700° C. for about one minute, cooling to room temperature, and heating in air at least 350° C. for up to about 20 hours; and
    providing a gaseous mixture comprising $O_2$ molecules and $N_2$ molecules to a feed side of said membrane resulting in selective transport of said $O_2$ molecules through said membrane to a permeate side of said membrane.

8. The method of claim 7, wherein said membrane is made of a plurality of SAPO crystals, substantially all of said SAPO crystals being less than or equal to about 2 μm in size.

9. The method of claim 7, wherein said membrane has pore sizes in a range of about 0.346 nm to about 0.38 nm.

10. The method of claim 7, wherein said precursor material has a composition of about 1.0 $Al_2O_3$:1.0 $P_2O_5$:0.4 $SiO_2$:1.0 TEAOH:0.8 dipropylamine:0.8 cyclohexylamine:at least 100 $H_2O$.

11. The method of claim 7, wherein said immersed seeded porous support is heated to a temperature of at least about 200° C. and held at said temperature for less than about 8 hours.

12. The method of claim 7, wherein said porous support is made of one of a ceramic and a metal.

* * * * *